Oct. 26, 1965   J. G. REID, JR   3,213,935
LIQUID DISTRIBUTING MEANS
Filed Aug. 1, 1963
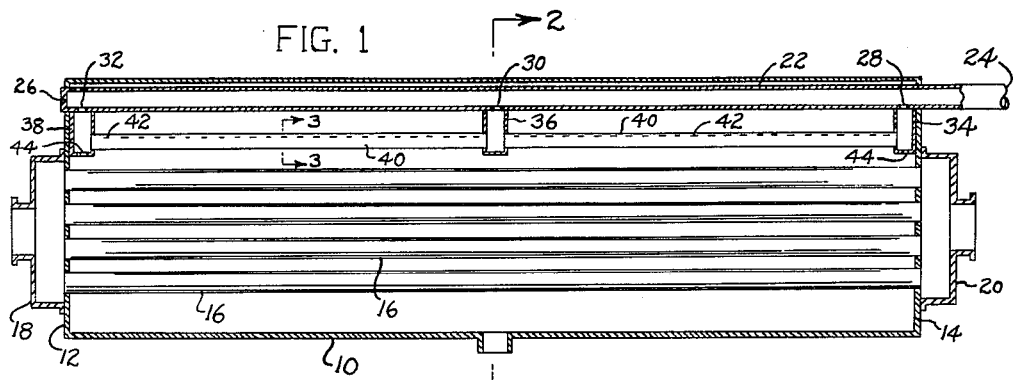
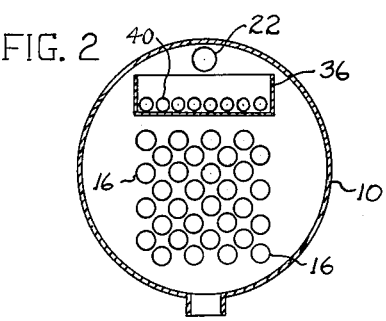
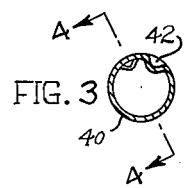
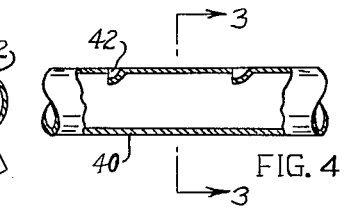
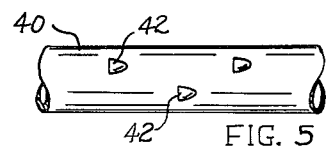
INVENTOR.
JOHN G. REID, JR.
BY
JOHN E. McRAE
ATTORNEY United States Patent Office 3,213,935
Patented Oct. 26, 1965

3,213,935
LIQUID DISTRIBUTING MEANS
John Graham Reid, Jr., Grosse Pointe, Mich., assignor to American Radiator & Standard Sanitary Corporation, New York, N.Y., a corporation of Delaware
Filed Aug. 1, 1963, Ser. No. 299,274
5 Claims. (Cl. 165—117)

This invention relates to heat exchange units, and particularly to improved means for distributing heat exchange liquid in discrete droplets onto heat exchange tubes.

One object of the invention is to provide a liquid distributing means which distributes the liquid in closely spaced discrete drops on the heat exchange tube, whereby to establish a thin film of liquid along substantially the entire tube surface.

A further object is to provide a liquid distributing means which distributes substantially all of the liquid in discrete drop form without liquid loss, as by undesired spraying or continuous gravity streams.

An additional object is to provide a liquid distributing means having a self-contained mechanism for maintaining a regulated pressure on the liquid as it is being distributed, thereby ensuring an even liquid flow.

Another object is to provide a liquid distributing means which evenly wets substantially the entire surface of each heat exchange tube.

A further object is to provide a liquid distributing means which includes low cost circular tubes as components thereof.

A further object is to provide a liquid distributing means which avoids reliance on capillary mechanisms such as curtains, screens, wicks, or the like.

Another object is to provide a liquid distributing means which is free from clogging tendencies, and which has a relatively long service life.

Other objects of this invention will appear from the following description and appended claims, reference being had to the accompanying drawings forming a part of this specification wherein like reference characters designate corresponding parts in the several views.

In the drawings:

FIGURE 1 is a longitudinal sectional view of a heat exchange unit having one embodiment of the invention incorporated therein;

FIG. 2 is a sectional view taken on line 2—2 in FIG. 1;

FIG. 3 is an enlarged fragmentary sectional view taken on line 3—3 in FIG. 1;

FIG. 4 is a sectional view on line 4—4 in FIG. 3; and

FIG. 5 is a top plan view of the FIG. 4 structure.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in FIG. 1, the invention is embodied in a heat exchange unit which comprises a cylindrical shell 10 having end walls or tube sheets 12 and 14. Extending between the end walls are smooth surfaced heat exchange tubes 16 arranged in eight vertical rows. Suitable header members 18 and 20 are provided for delivering heat exchange liquid to and accepting heat exchange liquid from the heat exchange tubes 16, all as conventional in the art.

The heat exchange unit as generally shown in the drawings can be used in various different environments, as for example as the generator, absorber or evaporator in an absorption type refrigeration system. In actual practice the unit may be of different lengths, as for example fifteen feet, and may contain various different numbers of heat exchange tubes, as for example 200. The tubes may be smooth-surfaced or finned.

The present invention is particularly concerned with means for distributing heat exchange liquid onto the outer surfaces of the heat exchange tubes 16. As shown in FIG. 1, the distributing means comprises a horizontal liquid supply conduit 22 having an open end 24 for accepting liquid, and a closed or capped end 26 for causing the liquid to be discharged through different ones of the apertures 28, 30 and 32. Each aperture is arranged above a chamber defined by a trough-like receptacle 34, 36 or 38. As shown in FIG. 2, each receptacle is opentopped so that the liquid therein is at the pressure prevailing in the space between the tube sheets 12 and 14. The depth of the receptacle is thus determinative of the maximum liquid pressure therein.

Extending between receptacles 34, 36 and 38 are horizontal dripper tubes 40. Each dripper tube opens at its ends to the receptacles so that receptacle liquid flows from each of two receptacles into each end of each tube. As shown in FIGS. 1 and 4, each dripper tube 40 is provided with spaced flow openings 42 in its upper surface. In operation, liquid completely fills tubes 40 and oozes upwardly through the flow openings. It then flows downwardly around the outer surface of each distributor tube and drips from the bottom surface of the tube onto the uppermost heat exchange tube in the subjacent vertical row of tubes 16. The liquid then flows down around that tube and drips onto the next lower tube, the process being repeated until the liquid is either evaporated or reaches the bottom wall of shell 10, depending on the use to which the heat exchange unit is put. In any case, as the liquid gravitationally flows down tubes 16 it exchanges heat with the fluid flowing within the tubes.

Openings 42 are closely spaced, as for example about one-half inch apart, so that the droplets are close enough together to wet substantial areas of tubes 16. The wetting action is facilitated by the fact that the droplets spread out to form a thin film as they strike the upper surface of each tube 16. The flow openings in distributor tubes 40 are preferably formed by low cost piercing or lancing operations which involve an indentation of the tube surface as seen in FIG. 4. The depth of the indentation is controlled to provide the desired size opening. Preferably the opening is chosen in relation to the head of liquid in tubes 40 (as determined by the depth of receptacles 34, 36 and 38) so that the liquid merely oozes out of openings 42 rather than issuing as a spray. Openings 42 could, without affecting operability, be formed as circular holes, as by punching or drilling. However the lancing method may be preferable from the cost standpoint.

It will be noted that alternate ones of openings 42 are located on opposite sides of the vertical centerline of the dripper tube. This arrangement prevents the individual liquid streams from merging together as they issue from the openings. In certain experimental constructions openings 42 were located on the tube vertical centerline but it was found that some of the issuing streams combined to form larger streams; the larger streams starved certain areas of tube 40 of liquid so that the liquid dropped from tube 40 as a series of relatively large, widely spaced droplets. Smaller, closely spaced droplets are preferred because they provide a more uniform film on tubes 16.

One interesting feature of the illustrated liquid distributing means is the arrangement of receptacles 34, 36 and 38, whereby liquid is fed to each dripper tube 40 through each end of the tube. This arrangement ensures that each of the openings 42 will receive an adequate supply of liquid. Previously dripper tubes had been fed with liquid through only one end of the tube. In such arrangements the flow openings adjacent the inlet end of the tube had more than an adequate supply of liquid while the flow openings remote from the inlet end of the tube were starved of liquid.

In order for the illustrated distributing means to operate to best advantage it is desirable that each receptacle 34, 36 or 38 feed approximately the same amount of liquid to tubes 40. In order to achieve this objective the flow of liquid from supply conduit 24 is regulated by careful attention to the designed sizes of apertures 28, 30 and 32. Preferably aperture 28 is somewhat smaller than aperture 30, and aperture 30 is in turn somewhat smaller than aperture 32. For example, when conduit 22 has a diameter of about 1¼-inch the aperture 28 may be formed as a ¼-inch hole, aperture 30 as a 5/16 inch hole and aperture 32 as a ⅜-inch hole. By this arrangement apertures 28 and 30 are prevented from starving aperture 32 of liquid.

It is possible to distribute liquid to receptacles 34, 36 and 38 by admitting the liquid to pipe 24 at its midpoint rather than at its right end as illustrated in the drawing. However in some cases it is preferred to admit the liquid into the end of the heat exchange unit rather than from above its midpoint. In such cases the use of graduated size apertures 28, 30 and 32 is a useful method of ensuring proper filling of the receptacles.

During operation it is intended that the subtraction of liquid through openings 42 will balance the flow of liquid into supply conduit 24 so that receptacles 34, 36 and 38 will not overflow. However any inadvertent overflow is not damaging to the unit; it is merely disadvantageous because the liquid bypasses the heat exchange tubes by flowing over the sides of the receptacles. The overflow constitutes a loss in heat exchange action.

During periods when liquid is not being supplied to conduit 24 it is desirable that tubes 40 be drained of liquid, since stagnant liquid in these tubes would have a tendency to deposit any entrained solid particles in flow openings 42. To facilitate the draining operation one or more of receptacles 34, 36 and 38 may be provided with small drain ports 44. As shown in FIG. 1, receptacles 34 and 38 are provided with these ports, while receptacle 36 is imperforate. During operational periods a small flow of liquid issues through each port 44; however the ports are sized so that the flow is not excessive. The flow through ports 44 is of course a bypassing of the tubes 40 so that apertures 28, 30 and 32 are sized with this in mind.

The main features of this invention are the staggering of flow openings 42 on opposite sides of the dripper tube vertical centerline, the use of chambers or receptacles for feeding liquid into both ends of each dripper tube at a regulated pressure, and the arrangement of supply conduit 24 for obtaining substantially the same liquid head in each receptacle.

What is claimed is:

1. In a heat exchange unit having horizontal heat exchange tubes arranged in vertical rows, and means for distributing heat exchange liquid onto the uppermost tube in each vertical row: the improvement wherein the distributing means comprises a horizontal liquid supply conduit having an open inlet end and a closed end; at least three liquid receptacles underlying the supply conduit at spaced points therealong; apertures in the supply conduit for directing liquid from the conduit into each receptacle; horizontal dripper tubes communicating with and extending between the receptacles, one above each row of heat exchange tubes; each dripper tube having spaced flow openings in its upper surface for enabling liquid to ooze onto the upper surface of each dripper tube before proceeding downwardly on the dripper tube outer surface and thence onto the uppermost heat exchange tube in the subjacent vertical row.

2. The combination of claim 1 wherein the apertures in the supply conduit are graduated in size to maintain substantially the same liquid level in each receptacle.

3. The combination of claim 1 wherein at least one of the receptacles is provided with a drain port located below the level of the flow openings in the dripper tubes.

4. In a heat exchange unit having horizontal heat exchange tubes arranged in vertical rows, and means for distributing heat exchange liquid onto the uppermost tube in each vertical row: the improvement wherein the distributing means comprises a horizontal liquid supply conduit having an open inlet end and a closed end; at least three liquid receptacles underlying the supply conduit at spaced points therealong; graduated size apertures in the supply conduit for directing liquid from the conduit into each receptacle and maintaining substantially the same liquid level therein; a series of dripper tubes extending between and communicating with the receptacles above the heat exchange tubes, each dripper tube having spaced flow openings in its upper surface for enabling liquid to ooze onto the upper surface of each dripper tube before proceeding downwardly on the dripper tube outer surface; alternate ones of said flow openings being located on opposite sides of the tube vertical centerline to prevent intermingling of adjacent liquid streams.

5. In a heat exchange unit having horizontal heat exchange tubes arranged in vertical rows, and means for distributing heat exchange liquid onto the uppermost tube in each vertical row: the improvement wherein the distributing means comprises a horizontal liquid supply conduit having an inlet means; at least three liquid receptacles underlying the supply conduit at spaced points therealong; apertures in the supply conduit for directing liquid from the conduit into each receptacle; horizontal dripper tubes communicating with and extending between the receptacles, one above each row of heat exchange tubes; each dripper tube having spaced flow openings in its upper surface for enabling liquid to ooze onto the upper surface of each dripper tube before proceeding downwardly on the dripper tube outer surface and thence onto the uppermost heat exchange tube in the subjacent vertical row.

References Cited by the Examiner

UNITED STATES PATENTS

| | | | |
|---|---|---|---|
| 1,546,841 | 7/21 | Kuhn | 165—117 |
| 1,993,390 | 3/35 | Voss | 165—115 |
| 2,200,355 | 5/40 | Cornell | 165—117 |

CHARLES SUKALO, *Primary Examiner.*

KENNETH W. SPRAGUE, *Examiner.*